US012767146B2

(12) United States Patent
Simoncini et al.

(10) Patent No.: US 12,767,146 B2
(45) Date of Patent: Oct. 20, 2026

(54) SYSTEMS AND METHODS FOR AUTOMATICALLY DETECTING ANOMALOUS DRIVING PATTERNS IN VEHICLES

(71) Applicant: Verizon Patent and Licensing Inc., Basking Ridge, NJ (US)

(72) Inventors: Matteo Simoncini, Pistoia (IT); Marco Boschi, Ravenna (IT); Alessio Sanfratello, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 187 days.

(21) Appl. No.: 18/425,175

(22) Filed: Jan. 29, 2024

(65) Prior Publication Data

US 2025/0242815 A1 Jul. 31, 2025

(51) Int. Cl.
*B60W 40/09* (2012.01)
*B60W 50/14* (2020.01)

(52) U.S. Cl.
CPC ............ *B60W 40/09* (2013.01); *B60W 50/14* (2013.01)

(58) Field of Classification Search
CPC .............................. B60W 40/09; B60W 50/14
See application file for complete search history.

(56) References Cited

U.S. PATENT DOCUMENTS 11,840,244 B2 * 12/2023 Levy .................... B60W 50/045
2020/0216080 A1 * 7/2020 Soltanian ............. G06N 3/0442
2021/0082292 A1 * 3/2021 Sindhwani ............. G06N 20/00

FOREIGN PATENT DOCUMENTS

CA 3232488 A1 * 3/2023 ............. G06N 3/045

OTHER PUBLICATIONS

"A Deep-Convolutional-Neural-Network-Based Semi-Supervised Learning Method for Anomaly Crack Detection" by X. Gao, et al. App;/ Sco/ 2-22. 12. 9244 (Year: 2022).*
"A deep neural framework for real-time vehicular accident detection based on motion temporal templates" by S. Bakheet et al., Heliyon 8 (2022) (Year: 2022).*
"A Novel Internet of Things-Enabled Accident Detection and Reporting System for Smart City Environments", by F. Bhatti et al., Sensors 2019, 19, 2071 (Year: 2019).*
(Continued)

*Primary Examiner* — Kito R Robinson
*Assistant Examiner* — Tanya C Sienko

(57) ABSTRACT

A device may receive historical input data associated with trips traversed by a plurality of vehicles with vehicle tracking units (VTUs), and may process the historical input data to generate training data. The device may train a neural network model, with the training data, to generate a trained neural network model that provides a latent space representation of vectors, and may cluster the latent space representation of vectors to generate clusters. The device may receive input data associated with a trip traversed by a vehicle of the plurality of vehicles with the VTUs, and may process the input data to generate time series data. The device may compare the time series data and the clusters to determine whether the trip is anomalous or not anomalous, and may perform one or more actions based on the determination of whether the trip is anomalous or not anomalous.

20 Claims, 12 Drawing Sheets

(56) References Cited

OTHER PUBLICATIONS

"Conditioning Latent-Space Clusters for Real-World Anomaly Classification" by D. Bogdoll et al., aeXiv:2309.0967v1 Sep. 18, 2023 (Year: 2023).*
"Into Image Embedding and Autoencoders" by M. Gronne Set. 1, 2022 https://towardsdatascience.com/an-extensive-introduction-to-image-embedding-and-auto-encoders-0-6-5c5d9a18fcaa/ (Year: 2022).*
"One Thousand and One Hours: Self-driving Motion Prediction Dataset" by J. Houston et al. arXiv: 2006.14480v2 Nov. 16, 2020. (Year: 2020).*
"Anomaly Detection in the latent Space of VAEs" by S. Klaus, Bachelor's Thesis, Karlsruhe Institute of Technology (KIT), 2022. (Year: 2022).*

* cited by examiner

SYSTEMS AND METHODS FOR AUTOMATICALLY DETECTING ANOMALOUS DRIVING PATTERNS IN VEHICLES

BACKGROUND

A harsh driving event associated with a vehicle may include hard braking by the vehicle, harsh acceleration by the vehicle, harsh cornering by the vehicle, an impact experienced by the vehicle, and/or the like.

DETAILED DESCRIPTION OF EXAMPLE EMBODIMENTS

Figure 1A:
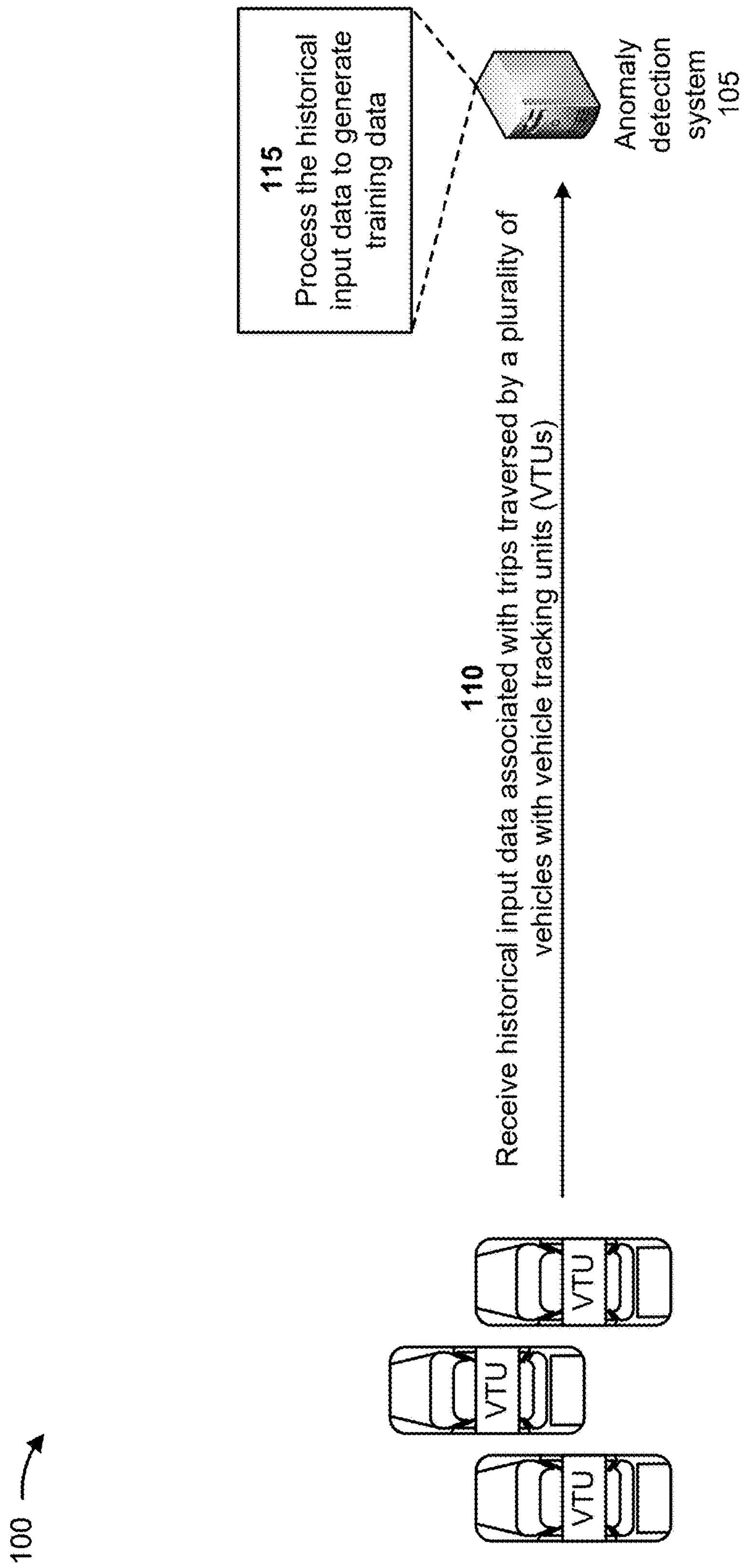
FIGS. 1A-1H are diagrams of an example associated with automatically detecting anomalous driving patterns in vehicles.

The following detailed description of example implementations refers to the accompanying drawings. The same reference numbers in different drawings may identify the same or similar elements.

Harsh driving event detection by a vehicle (e.g., via a vehicle tracking unit (VTU)) may be performed based on a fixed threshold hardcoded either in firmware or a configuration of the VTU. Harsh driving event may be detected in order to alert a driver of the vehicle and/or a fleet manager responsible for the vehicle of possible dangerous behavior. The fixed threshold may be manually adjusted to capture a majority of harsh driving events experienced by a vehicle, but may still fail to guarantee coverage of all harsh driving events. Thus, current techniques for detecting harsh driving events consume excessive computing resources (e.g., processing resources, memory resources, communication resources, and/or the like), networking resources, and/or other resources associated with failing to accurately identify all harsh driving events experienced by the vehicle, failing to generate alerts for the undetected harsh driving events, generating incorrect classifications of vehicle maneuvers, encouraging dangerous vehicle maneuvers based on the incorrect classifications, handling traffic accidents caused by the dangerous vehicle maneuvers, and/or the like.

Some implementations described herein relate to an anomaly detection system that automatically detects anomalous driving patterns in vehicles. For example, the anomaly detection system may receive historical input data associated with trips traversed by a plurality of vehicles with VTUs, and may process the historical input data to generate training data. The anomaly detection system may train a neural network model, with the training data, to generate a trained neural network model that provides a latent space representation of vectors, and may cluster the latent space representation of vectors to generate clusters. The anomaly detection system may receive input data associated with a trip traversed by a vehicle of the plurality of vehicles with the VTUs, and may process the input data to generate time series data. The anomaly detection system may compare the time series data and the clusters to determine whether the trip is anomalous or not anomalous, and may perform one or more actions based on the determination of whether the trip is anomalous or not anomalous.

In this way, the anomaly detection system automatically detects anomalous driving patterns in vehicles. For example, the anomaly detection system may infer potential harsh driving events based on other driving events and may report the potential harsh driving events for further investigation (e.g., by automatically requesting a video be captured from a vehicle dashcam, if available). The anomaly detection system may utilize a neural network model to detect any anomalies based on VTU data (e.g., a sudden decrease in speed with no corresponding harsh driving event). This may ensure that harsh driving events missed by the VTU are captured and handled. For example, the anomaly detection system may identify a vehicle gently stopping at a side of a highway (e.g., due to a problem with a vehicle engine), a vehicle stopping for a very long time period in a place where the vehicle is not supposed to be, a vehicle performing a detour from a job due to personal reasons, a vehicle parked in an uncommon position outside of working hours, a vehicle suddenly stopping with no triggered harsh driving event, a previously unknown VTU malfunction, and/or the like. Thus, the anomaly detection system may conserve computing resources, networking resources, and/or other resources that would have otherwise been consumed by failing to accurately identify all harsh driving events experienced by the vehicle, failing to generate alerts for the undetected harsh driving events, generating incorrect classifications of vehicle maneuvers, encouraging dangerous vehicle maneuvers based on the incorrect classifications, handling traffic accidents caused by the dangerous vehicle maneuvers, and/or the like.

FIGS. 1A-1H are diagrams of an example 100 associated with automatically detecting anomalous driving patterns in vehicles. As shown in FIGS. 1A-1H, example 100 includes an anomaly detection system 105 associated with a plurality of vehicles with VTUs. The anomaly detection system 105 may include a system that automatically detects anomalous driving patterns in vehicles. Further details of the anomaly detection system 105, the vehicles, and the VTUs are provided elsewhere herein.

As shown in FIG. 1A, and by reference number 110, the anomaly detection system 105 may receive historical input data associated with trips traversed by the plurality of vehicles with the VTUs. For example, the plurality of vehicles may traverse trips and the VTUs of the plurality of vehicles may record the historical input data associated with the trips. In some implementations, the historical input data may be captured by devices other than the VTUs, such as Internet of Things (IoT) devices that periodically report events of different kinds associated with the plurality of vehicles during the trips. The historical input data may include data identifying positions of the plurality of vehicles during the trips (e.g., over a time period), speeds of the plurality of vehicles during the trips, accelerations of the plurality of vehicles during the trips, engine on/off conditions of the plurality of vehicles during the trips, harsh driving events (e.g., hard braking, harsh acceleration, harsh cornering, impacts, and/or the like) associated with the plurality of vehicles during the trips, headings of the plurality of vehicles during the trips, incremental and total distances traveled by the plurality of vehicles during the trips, proximities of the plurality of vehicles to intersections during the trips, types of roads traversed by the plurality of vehicles during the trips, and/or the like.

In some implementations, the anomaly detection system 105 may continuously receive the historical input data from the VTUs of the plurality of vehicles, may periodically receive the historical input data from the VTUs of the plurality of vehicles, may receive the historical input data from the VTUs of the plurality of vehicles based on requesting the historical input data from the VTUs, and/or the like. In some implementations, the anomaly detection system 105 may store the historical input data in a data structure (e.g., a database, a table, a list, and/or the like) associated with the anomaly detection system 105.

As further shown in FIG. 1A, and by reference number 115, the anomaly detection system 105 may process the historical input data to generate training data. For example, the anomaly detection system may be associated with a neural network model, such as a variational autoencoder model. The anomaly detection system 105 may train the neural network model with normal trip data (e.g., data associated with not anomalous trips) so that a latent space generated by the neural network model may be configured to include data associated with similar trips proximate to each other. The anomaly detection system 105 may process the historical input data by identifying normal trips (e.g., not anomalous trips) in the historical input data, and retrieving the normal trip data from the historical input data. For each data point in the normal trip data, the anomaly detection system 105 may select data points in a previous time period (e.g., in minutes) and a current time period. If the previous time period of a trip is less than a desired time period, the anomaly detection system 105 may omit the selected data points in the previous time period from the normal trip data. The anomaly detection system 105 may transform each data point in the normal trip data to include a timestamp relative to the start of a trip, and may append a data point to represent a current time relative to the start of the trip. The current time, when different from a last data point sent from the VTU, may be provided to the neural network model by appending an additional data point carrying only the timestamp relative to the start of the trip, and a random duration (e.g., between zero and five seconds) may be introduced for training purposes.

In some implementations, if the historical input data does not include the data identifying the proximities of the plurality of vehicles to intersections during the trips and/or the types of roads traversed by the plurality of vehicles during the trips, the anomaly detection system 105 may add such data to the normal trip data. After performing the aforementioned steps, the normal trip data may include a temporally ordered set of feature vectors for each trip (e.g., a time series for each trip). The anomaly detection system 105 may normalize the temporally ordered set of feature vectors to generate the training data for training the neural network model.

Figure 1B:
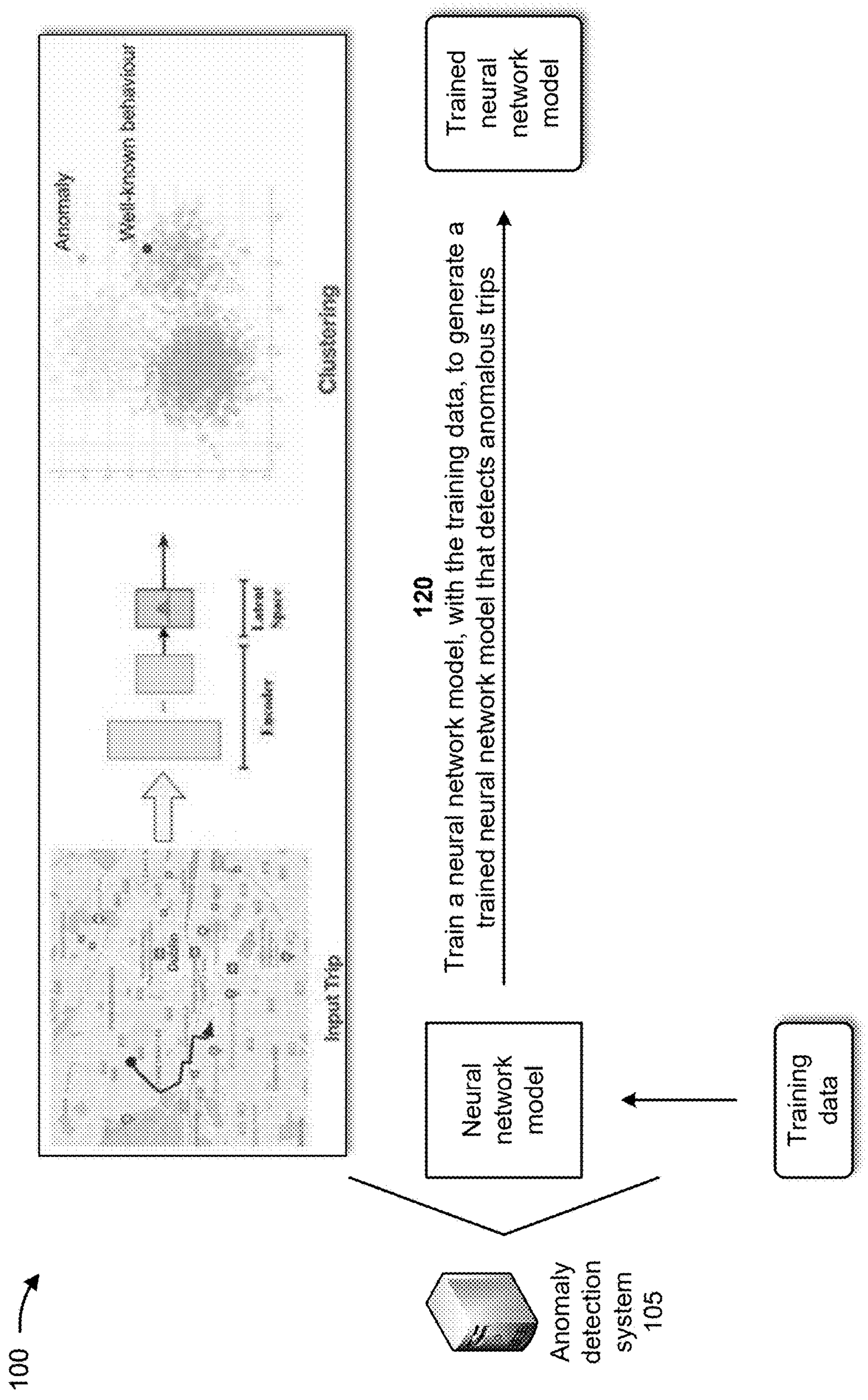

As shown in FIG. 1B, and by reference number 120, the anomaly detection system 105 may train a neural network model, with the training data, to generate a trained neural network model. For example, the anomaly detection system may utilize the training data to train the neural network model to reconstruct the historical input data as closely as possible. In some implementations, the training of the neural network model to generate the trained neural network model may be completely unsupervised with no need for labeled data. Further details of training a model, such as the neural network model, are provided below in connection with FIG. 2. Once the trained neural network model is generated, anomaly detection system 105 may retain a latent space representation of the training data. Thus, the output of the trained neural network model may include the latent space representation of the training data. The latent space representation may include vectors (e.g., by design of variational autoencoder model) that cluster close to each other when the vectors represent similar trips. Thus, the trained neural network model creates clusters of trips, with each cluster representing a type or class of trip. The clusters of trips may be utilized by the anomaly detection system 105 to determine whether a new trip is normal or anomalous. Since the normal trip data is utilized to train the neural network model, a new trip that is proximate (e.g., within a threshold distance) to any of the clusters generated by the trained neural network model may be considered normal, and a new trip that is not proximate to any of the clusters may be considered anomalous.

Figure 1C:
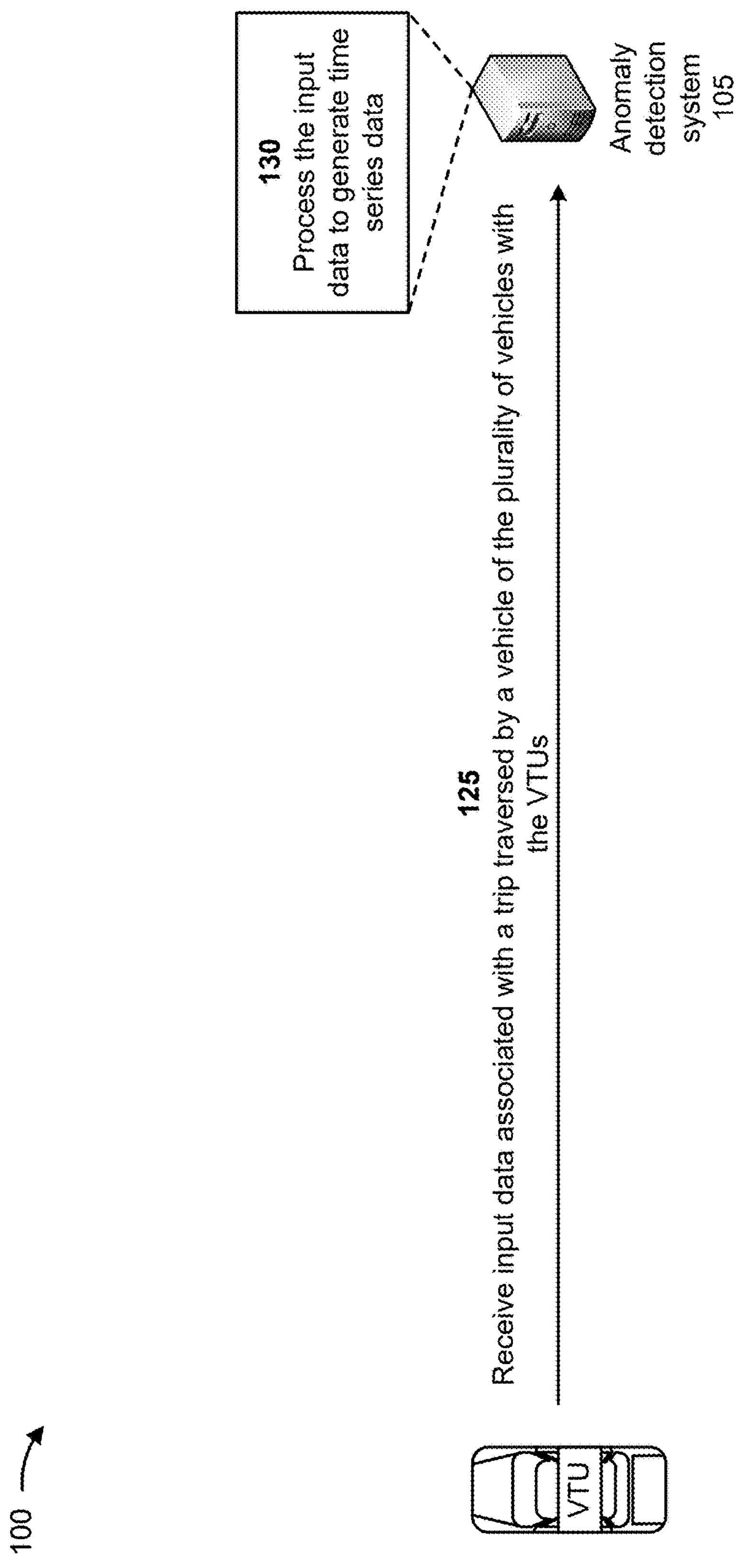

As shown in FIG. 1C, and by reference number 125, the anomaly detection system 105 may receive input data associated with a trip traversed by a vehicle of the plurality of vehicles with the VTUs. For example, a vehicle may traverse a trip, and a VTU of the vehicle may record the input data associated with the trip. The input data may include data identifying positions of the vehicle during the trip (e.g., over a time period), speeds of the vehicle during the trip, accelerations of the vehicle during the trip, engine on/off conditions of the vehicle during the trip, harsh driving events associated with the vehicle during the trip, headings of the vehicle during the trip, incremental and total distances traveled by the vehicle during the trip, proximities of the vehicle to intersections during the trip, types of roads traversed by the vehicle during the trip, and/or the like. In some implementations, the anomaly detection system 105 may continuously receive the input data from the VTU of the vehicle, may periodically receive the input data from the VTU of the vehicle, may receive the input data from the VTU of the vehicle based on requesting the input data from the VTU, and/or the like. In some implementations, the anomaly detection system 105 may store the input data in the data structure associated with the anomaly detection system 105.

In some implementations, the proximities of the vehicle to intersections during the trip and the types of roads traversed by the vehicle during the trip may enable the anomaly detection system 105 to more accurately detect anomalous trips associated with moving vehicles since such information is not considered in current techniques. The proximities of the vehicle to the intersections during the trip and the types of roads traversed by the vehicle may enable the anomaly detection system 105 to disambiguate some situations, such as flagging as non-anomalous a vehicle stopping at an intersection, flagging as non-anomalous a vehicle stopping on an urban road for a delivery, flagging as anomalous a vehicle stopping far away from an intersection on an highway, and/or the like. Without the proximities of the vehicle to intersections during the trip and the types of roads traversed by the vehicle during the trip, the performance of anomaly detection system 105 may be degraded with more false anomalies being detected and/or anomalies not being detected.

Figure 1D:
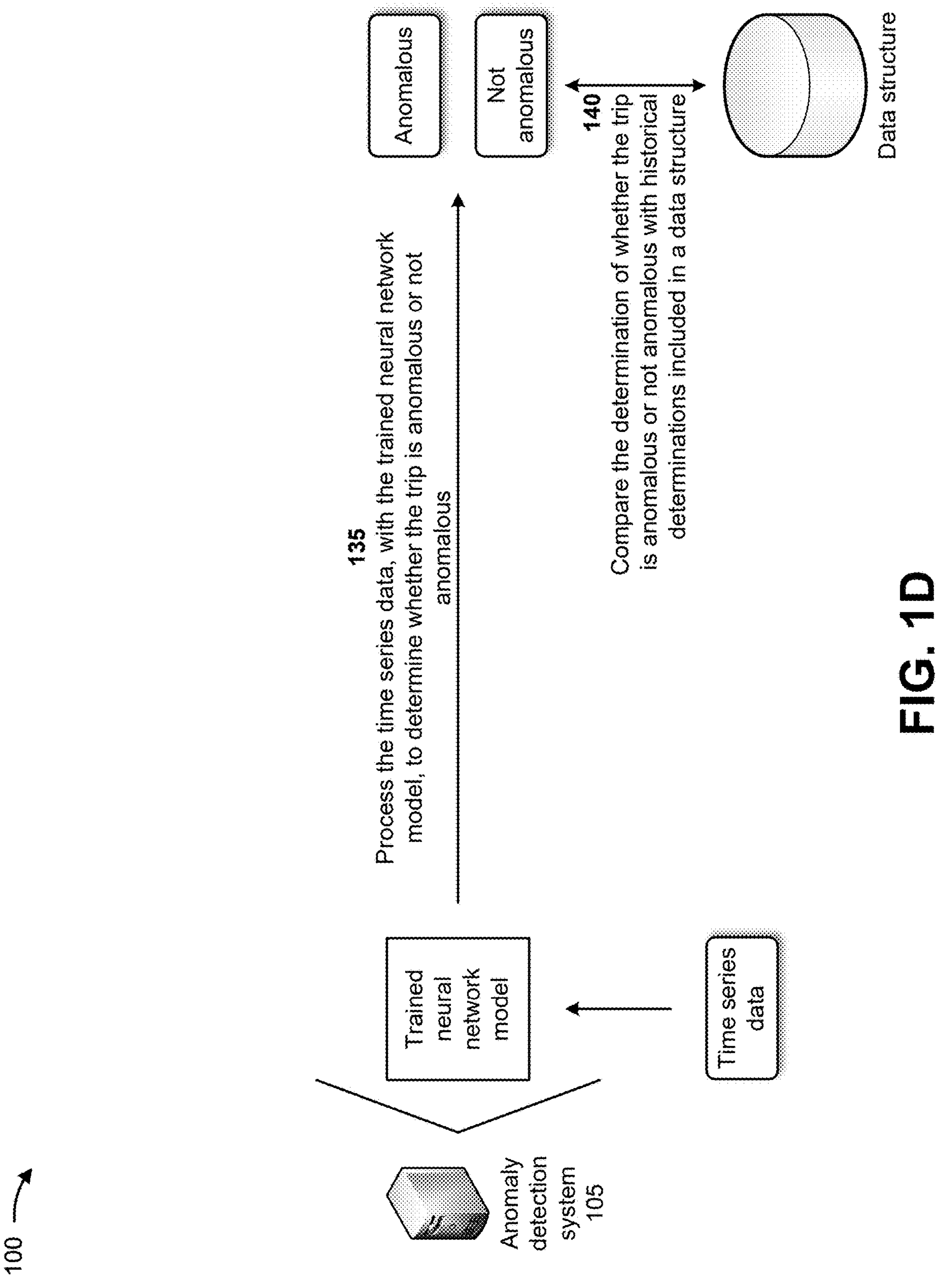

As further shown in FIG. 1C, and by reference number 130, the anomaly detection system 105 may process the input data to generate time series data. For example, the anomaly detection system 105 may process each data point of the input data by selecting data points in a previous time period (e.g., in minutes) and a current time period. If the previous time period of the trip is less than the desired time period, the anomaly detection system 105 may omit the selected data points in the previous time period from the input data. The anomaly detection system 105 may transform each data point of the input data to include a timestamp relative to a start of the trip, and may append a data point to represent a current time relative to the start of the trip. The current time may be determined based on a time of a last data point and a random duration (e.g., between zero and five seconds). In some implementations, if the input data does not include data identifying proximities of the vehicle to intersections during the trip and/or the types of roads traversed by the vehicle during the trip, the anomaly detection system 105 may add such data to the input data. After performing the aforementioned steps, the input data may include a temporally ordered set of feature vectors for the trip. The anomaly detection system 105 may normalize the temporally ordered set of feature vectors to generate the time series data. The time series data may be in the same format as the training data utilized to train the neural network model so that the time series data may be processed by the neural network model. As shown in FIG. 1D, and by reference number 135, the anomaly detection system 105 may process the time series data, with the trained neural network model, to determine whether the trip is anomalous or not anomalous. For example, the anomaly detection system 105 may process the time series data, with the trained neural network model, to generate a latent space representation of the time series data (e.g., of the trip). The anomaly detection system 105 may compare the latent space representation to each cluster previously generated by the trained neural network model. In some implementations, the anomaly detection system 105 may calculate a boundary for each of the clusters, and may determine whether the latent space representation is within one of the boundaries of the clusters based on calculated boundaries. If the latent space representation is outside the boundaries of the clusters, the anomaly detection system 105 may determine that the trip is anomalous. If the latent space representation is inside a boundary of one of the clusters, the anomaly detection system 105 may determine that the trip is normal (e.g., not anomalous).

In some implementations, if the VTU stops sending the input data (e.g., due to a vehicle crash, damage to the VTU, and/or the like), the anomaly detection system 105 may process the trip again also if no input data is received within a time period (e.g., in minutes), and this will lead the fictitious appended message with the current time to be much more distant from the last real message than in normal situations. In some implementations, if the trip is anomalous, the VTU of the vehicle may enter a potential anomaly state. If additional input data from the VTU indicates that the trip is anomalous, the VTU of the vehicle may enter an anomaly detected state.

As further shown in FIG. 1D, and by reference number 140, the anomaly detection system 105 may compare the determination of whether the trip is anomalous or not anomalous with historical determinations included in a data structure. For example, the anomaly detection system 105 may store, in the data structure associated with the anomaly detection system 105, input data for prior trips monitored by the anomaly detection system 105, latent space representations generated for the prior trips by the trained neural network model, historical determinations of the prior trips (e.g., anomalous or not anomalous), and/or the like. The anomaly detection system 105 may compare the determination of whether the trip is anomalous or not anomalous with the historical determinations of the prior trips to validate the determination of whether the trip is anomalous or not anomalous. For example, if the determination of whether the trip is anomalous or not anomalous matches one of the historical determinations, the anomaly detection system 105 may validate the determination of whether the trip is anomalous or not anomalous. Alternatively, if the determination of whether the trip is anomalous or not anomalous fails to match one of the historical determinations, the anomaly detection system 105 may invalidate the determination of whether the trip is anomalous or not anomalous.

Figure 1E:
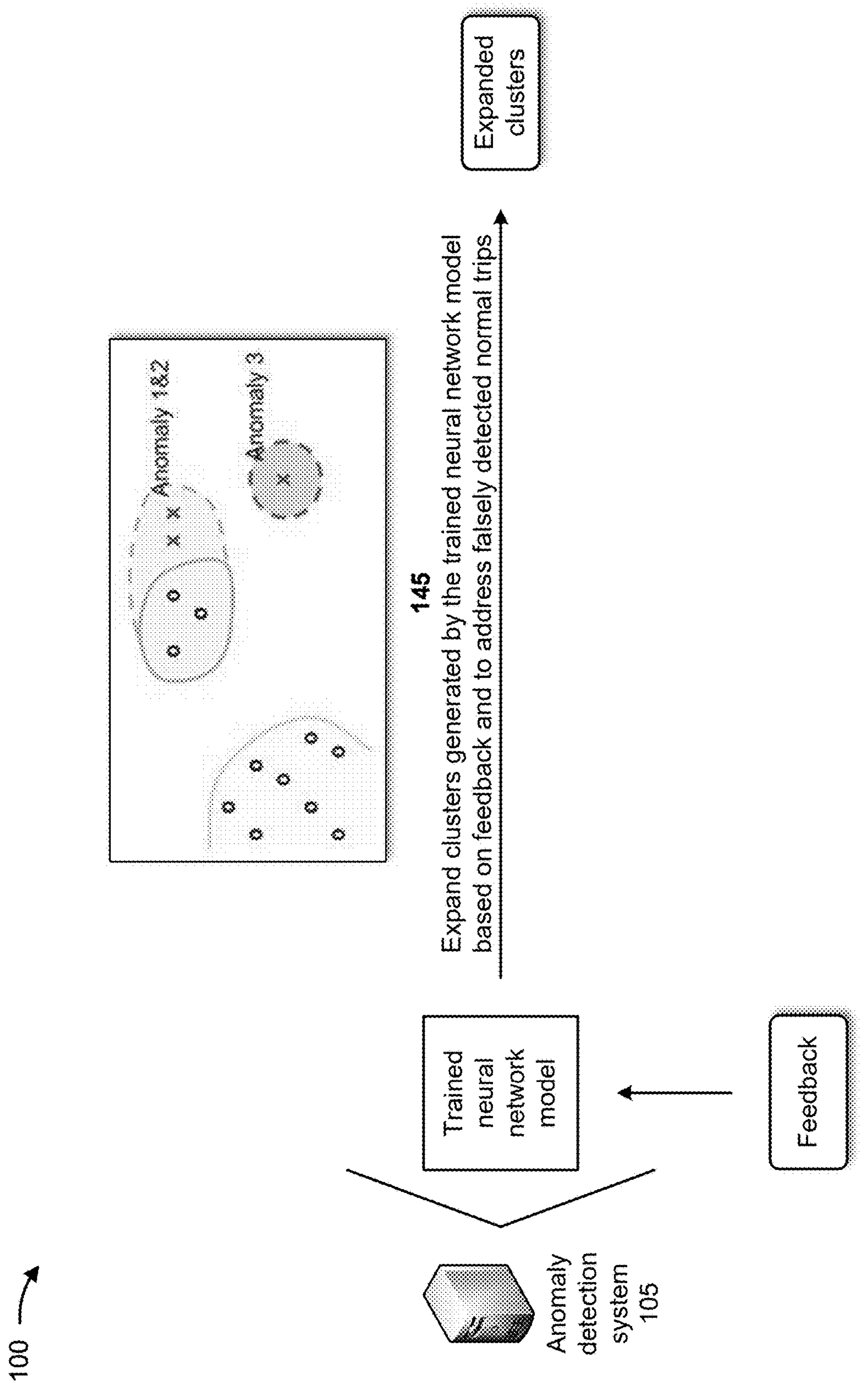

As shown in FIG. 1E, and by reference number 145, the anomaly detection system 105 may expand clusters generated by the trained neural network model based on feedback and to address falsely detected normal (not anomalous) trips. For example, the anomaly detection system 105 may utilize reinforcement techniques to modify and improve the trained neural network model. Having defined an anomalous trip as a latent space representation of the trip being located outside of one of the clusters determined during training, it is possible to further refine the neural network model based on review feedback from a user of the anomaly detection system 105. In some implementations, if the feedback indicates that the trained neural network model erroneously identified a trip as anomalous (e.g., a false positive), the anomaly detection system 105 may expand a closest cluster to include the trip, or may create a new cluster for the trip and potentially for other similar trips that have not been reviewed. The anomaly detection system 105 may determine whether to expand the closest cluster or to create a new cluster based on a distance threshold.

For example, if a first incorrectly identified anomalous trip is within the distance threshold of a cluster, the anomaly detection system 105 may expand the cluster to include the first incorrectly identified anomalous trip. If a second incorrectly identified anomalous trip is not within the distance threshold of any cluster, the anomaly detection system 105 may create a new cluster for the second incorrectly identified anomalous trip. In some implementations, a third incorrectly identified anomalous trip may not be within the distance threshold of a cluster until the cluster is expanded to include the first incorrectly identified anomalous trip. In such implementations, the anomaly detection system 105 may include the third incorrectly identified anomalous trip in the expanded cluster.

In some implementations, the anomaly detection system 105 may utilize a greedy model to expand the closest cluster or to create the new cluster. For example, the anomaly detection system 105 may periodically retrieve incorrectly identified anomalous trips and may sort the incorrectly identified anomalous trips based on distances of the incorrectly identified anomalous trips to clusters. The anomaly detection system 105 may calculate the distance threshold as a percentile (e.g., a seventy-fifth percentile) of the radii of the clusters. For each incorrectly identified anomalous trip, the anomaly detection system 105 may determine whether a distance of the incorrectly identified anomalous trip to a cluster is less than or equal to the distance threshold. If the distance of the incorrectly identified anomalous trip to the cluster is less than or equal to the distance threshold, the anomaly detection system 105 may expand the cluster to include the incorrectly identified anomalous trip in the cluster. If the distance of the incorrectly identified anomalous trip to the cluster is greater than the distance threshold, the anomaly detection system 105 may create a new cluster for the incorrectly identified anomalous trip.

Figure 1F:
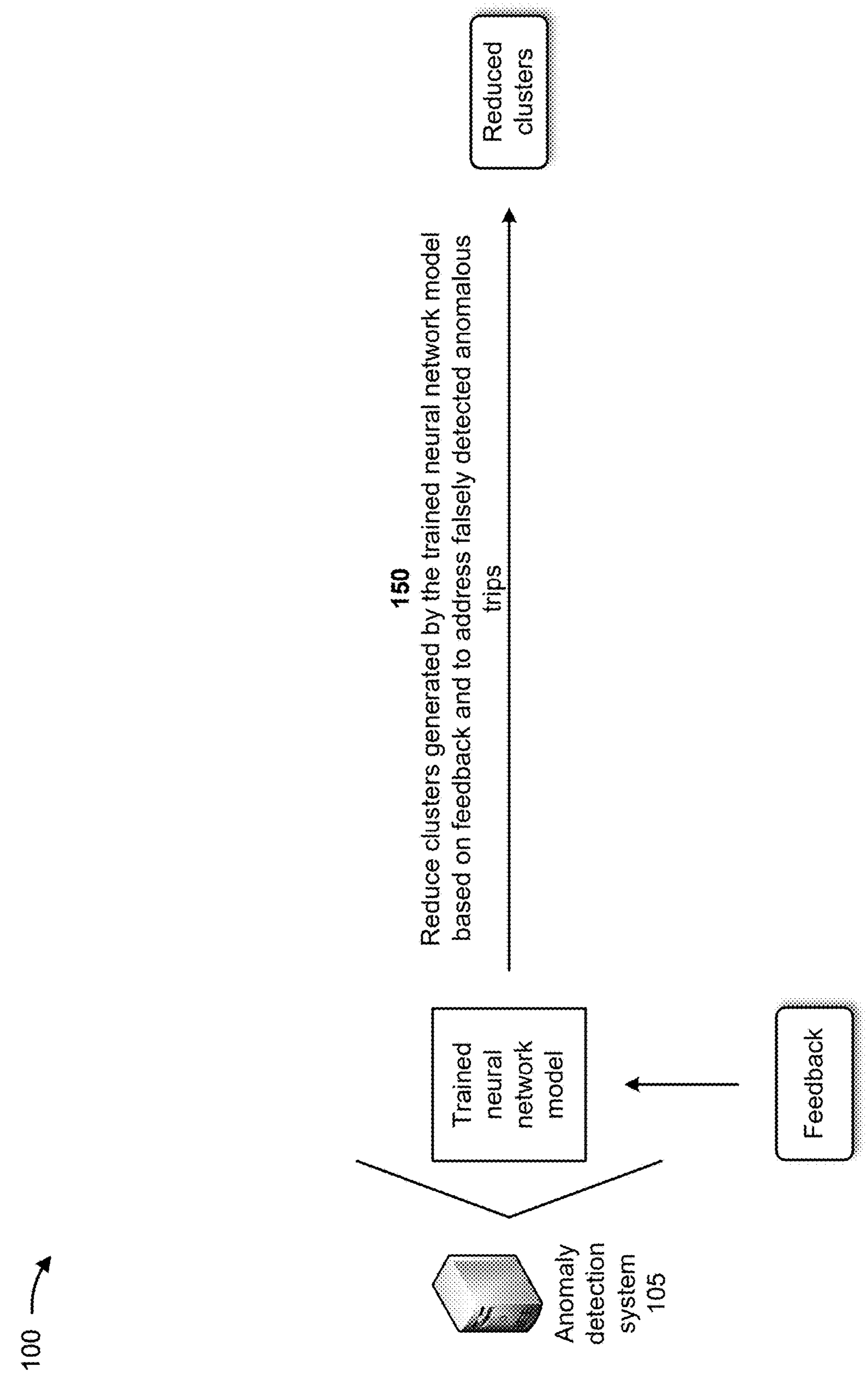

As shown in FIG. 1F, and by reference number 150, the anomaly detection system 105 may reduce clusters generated by the trained neural network model based on feedback and to address falsely detected anomalous trips. For example, similar to what is described above in connection with a false positive (e.g., when the trained neural network model erroneously identified a trip as anomalous), the feedback may indicate the trained neural network model erroneously failed to identify a trip as anomalous (e.g., a false negative). In some implementations, the anomaly detection system 105 may reduce one or more clusters generated by the trained neural network model based on the feedback and to address the false negative. In some implementations, if a falsely detected anomalous trip is in the middle of a cluster, the anomaly detection system 105 may not reduce the cluster but may convert the cluster to an anomaly cluster for the falsely detected anomalous trip, as described below in connection with FIG. 1G. In some implementations, the anomaly detection system 105 may utilize video associated with a falsely detected anomalous trip to adjust one or more clusters to exclude the falsely detected anomalous trip from their boundaries (e.g., to reduce the clusters).

Figure 1G:
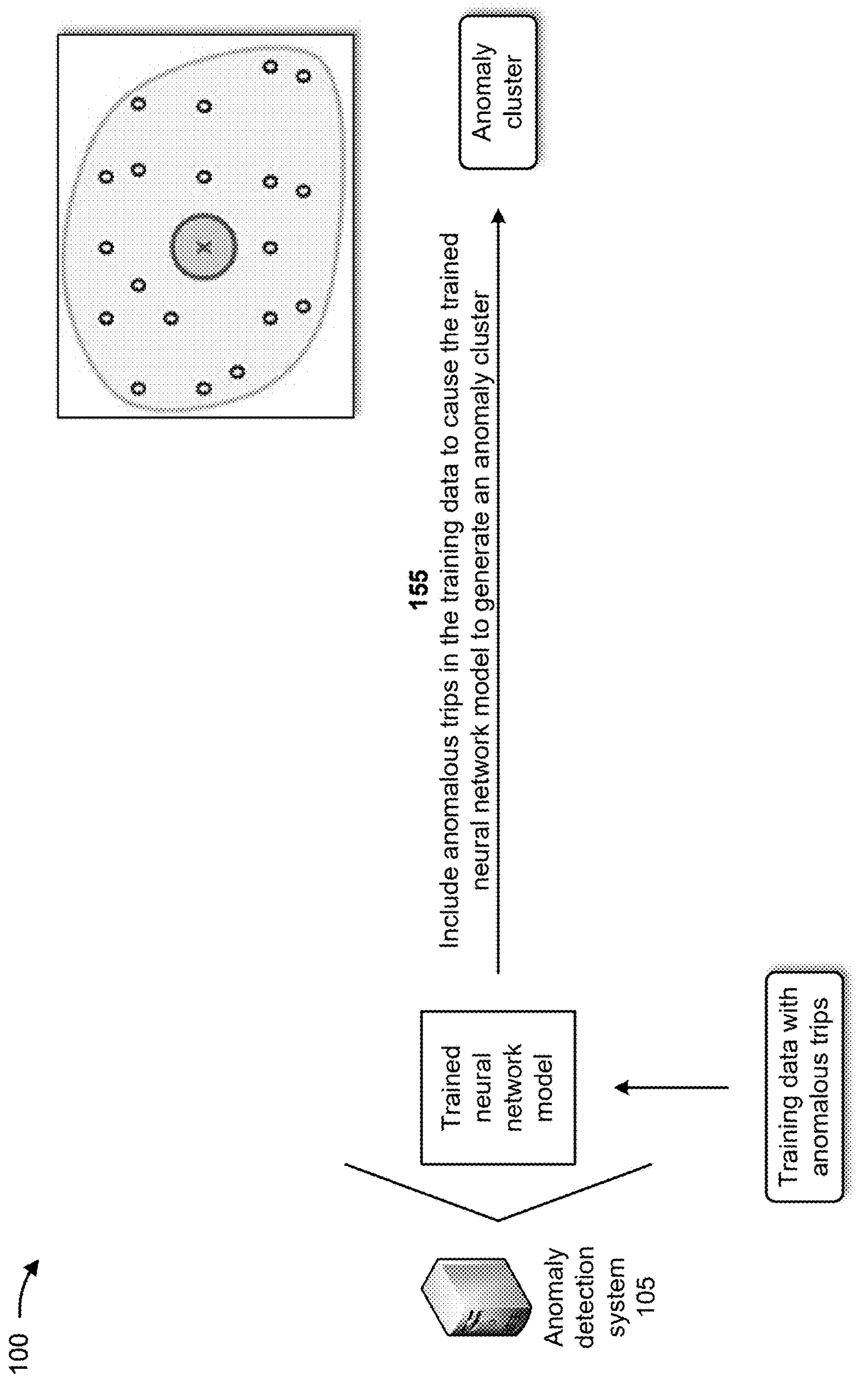

As shown in FIG. 1G, and by reference number 155, the anomaly detection system 105 may include anomalous trips in the training data to cause the trained neural network model to generate an anomaly cluster. For example, an anomaly may occur across trips, vehicles, and customers, which may result in creation of clusters of trips for anomalies. These anomaly clusters may cause improper classification of a trip as normal. To avoid the improper classification, anomalous trips (e.g., with harsh driving events detected by the VTUs) may be included in the training data, and may cause the trained neural network model to generate an anomaly cluster (e.g., marked with an anomaly label). In some implementations, if a new trip is located inside or closest to an anomaly cluster, the anomaly detection system 105 may classify the trip as anomalous and may expand a boundary of the anomaly cluster to include the new trip. In some implementations, if feedback indicates that a trip is anomalous, the anomaly detection system 105 may expand the boundary of the anomaly cluster to include the anomalous trip or may create a new anomaly cluster for the anomalous trip.

Figure 1H:
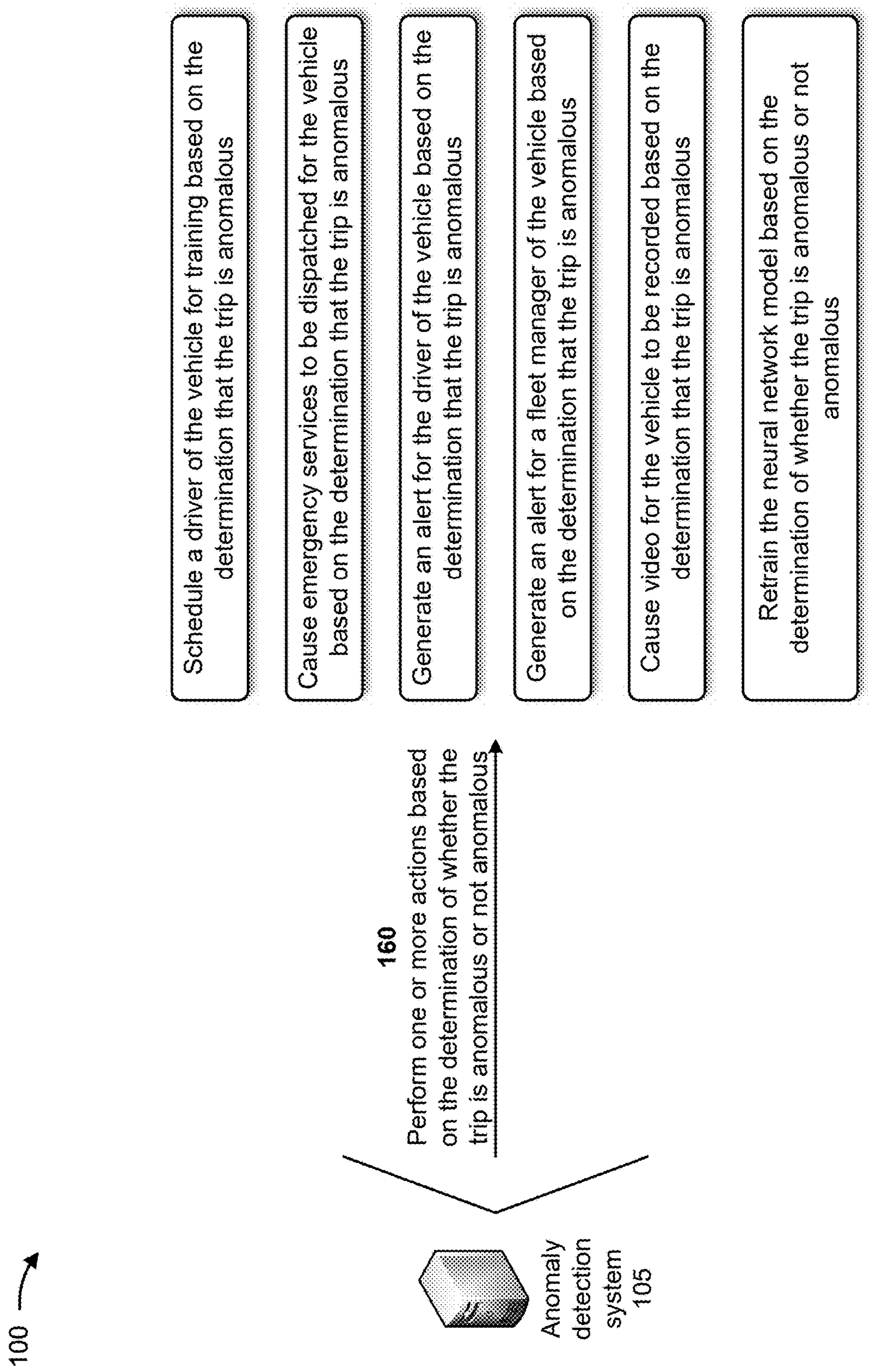

As shown in FIG. 1H, and by reference number 160, the anomaly detection system 105 may perform one or more actions based on the determination of whether the trip is anomalous or not anomalous. In some implementations, performing the one or more actions includes the anomaly detection system 105 scheduling a driver of the vehicle for training based on the determination that the trip is anomalous. For example, when the anomaly detection system 105 determines that a vehicle is involved in an anomalous trip (e.g., a trip not associated with work related duties), the anomaly detection system 105 may schedule a driver of the vehicle for training associated with actions performed by the driver during the anomalous trip. In this way, the anomaly detection system 105 conserves computing resources, networking resources, and/or other resources that would have otherwise been consumed by failing to generate alerts for the undetected harsh driving events.

In some implementations, performing the one or more actions includes the anomaly detection system 105 causing emergency services to be dispatched for the vehicle based on the determination that the trip is anomalous. For example, the anomaly detection system 105 may determine that a trip of the vehicle is anomalous since the vehicle is involved in a traffic accident. The anomaly detection system 105 may contact emergency services so that emergency personnel may be dispatched to help the driver of the vehicle involved in the traffic accident. In this way, the anomaly detection system 105 conserves computing resources, networking resources, and/or other resources that would have otherwise been consumed by failing to accurately identify all harsh driving events experienced by the vehicle.

In some implementations, performing the one or more actions includes the anomaly detection system 105 generating an alert for the driver of the vehicle based on the determination that the trip is anomalous. For example, if the anomaly detection system 105 determines that the trip for the vehicle is anomalous, the anomaly detection system 105 may generate an alert (e.g., an audible alert, a text alert, and/or the like) for the driver of the vehicle, and may provide the alert to the vehicle, to a telephone of the driver, and/or the like. In this way, the anomaly detection system 105 conserves computing resources, networking resources, and/or other resources that would have otherwise been consumed by failing to generate alerts for the undetected harsh driving events.

In some implementations, performing the one or more actions includes the anomaly detection system 105 generating an alert for a fleet manager of the vehicle based on the determination that the trip is anomalous. For example, if the anomaly detection system 105 determines that the trip for the vehicle is anomalous, the anomaly detection system 105 may generate an alert (e.g., an audible alert, a text alert, and/or the like) for the fleet manager of the vehicle, and may provide the alert to the fleet manager. In this way, the anomaly detection system 105 conserves computing resources, networking resources, and/or other resources that would have otherwise been consumed by failing to generate alerts for the undetected harsh driving events.

In some implementations, performing the one or more actions includes the anomaly detection system 105 causing video for the vehicle to be recorded based on the determination that the trip is anomalous. For example, if the anomaly detection system 105 determines that the trip for the vehicle is anomalous, the anomaly detection system 105 may cause a video device of the vehicle to capture video and to provide the video to the anomaly detection system 105. The anomaly detection system 105 may automatically process the video to validate that the trip is anomalous. In this way, the anomaly detection system 105 conserves computing resources, networking resources, and/or other resources that would have otherwise been consumed by encouraging dangerous vehicle maneuvers based on the incorrect classifications, handling traffic accidents caused by the dangerous vehicle maneuvers, and/or the like.

In some implementations, performing the one or more actions includes the anomaly detection system 105 retraining the neural network model based on the determination of whether the trip is anomalous or not anomalous. For example, the anomaly detection system 105 may utilize the determination of whether the trip is anomalous or not anomalous as additional training data for retraining the neural network model, thereby increasing the quantity of training data available for training the neural network model. Accordingly, the anomaly detection system 105 may conserve computing resources associated with failing to accurately identify all harsh driving events experienced by the vehicle, failing to generate alerts for the undetected harsh driving events, generating incorrect classifications of vehicle maneuvers, and/or the like.

In this way, the anomaly detection system 105 automatically detects anomalous driving patterns in vehicles. For example, the anomaly detection system 105 may infer potential harsh driving events based on other driving events and may report the potential harsh driving events for further investigation. The anomaly detection system 105 may utilize a neural network model to detect any anomalies based on VTU data. This may ensure that harsh driving events missed by the VTU are captured and handled. For example, the anomaly detection system 105 may identify a vehicle gently stopping at a side of a highway, a vehicle stopping for a very long time period in a place where the vehicle is not supposed to be, a vehicle performing a detour from a job due to personal reasons, a vehicle parked in an uncommon position outside of working hours, a vehicle suddenly stopping with no triggered harsh driving event, a previously unknown VTU malfunction, and/or the like. Thus, the anomaly detection system 105 may conserve computing resources, networking resources, and/or other resources that would have otherwise been consumed by failing to accurately identify all harsh driving events experienced by the vehicle, failing to generate alerts for the undetected harsh driving events, generating incorrect classifications of vehicle maneuvers, encouraging dangerous vehicle maneuvers based on the incorrect classifications, handling traffic accidents caused by the dangerous vehicle maneuvers, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
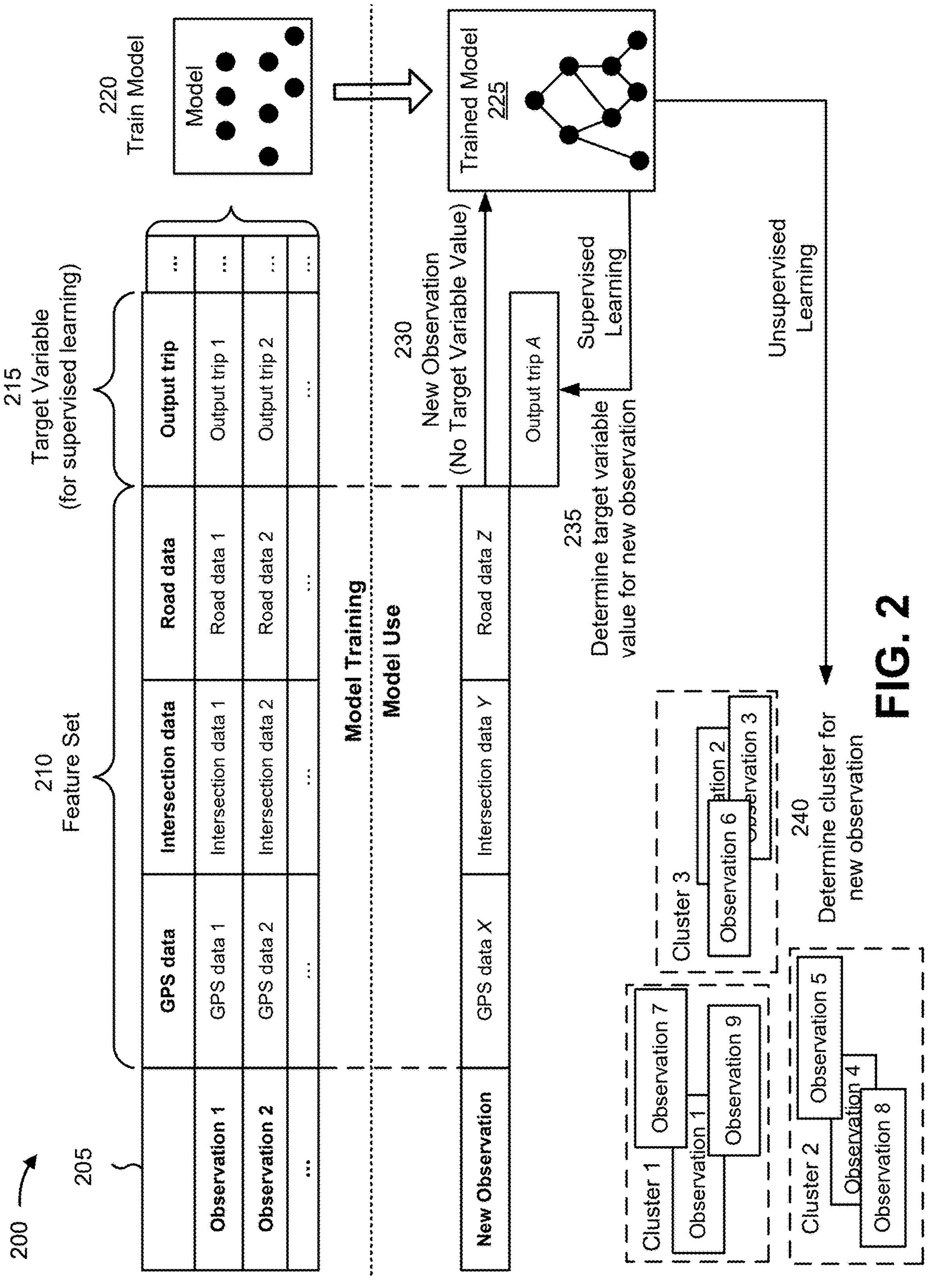
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the anomaly detection system 105.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the anomaly detection system 105, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the anomaly detection system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of global positioning sensor (GPS) data, a second feature of intersection data, a third feature of road data, and so on. As shown, for a first observation, the first feature may have a value of GPS data 1, the second feature may have a value of intersection data 1, the third feature may have a value of road data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is an output trip, which has a value of output trip 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of GPS data X, a second feature of intersection data Y, a third feature of road data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of output trip A for the target variable of output trip for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a GPS data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an intersection data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to automatically detect anomalous driving patterns in vehicles. The machine learning system may enable recognition and/or identification of tens, hundreds, thousands, or millions of features and/or feature values for tens, hundreds, thousands, or millions of observations, thereby increasing accuracy and consistency and reducing delay associated with automatically detecting anomalous driving patterns in vehicles relative to requiring computing resources to be allocated for tens, hundreds, or thousands of operators to manually detect anomalous driving patterns in vehicles.

As indicated above, FIG. 2 is provided as an example. Other examples may differ from what is described in connection with FIG. 2.

Figure 3:
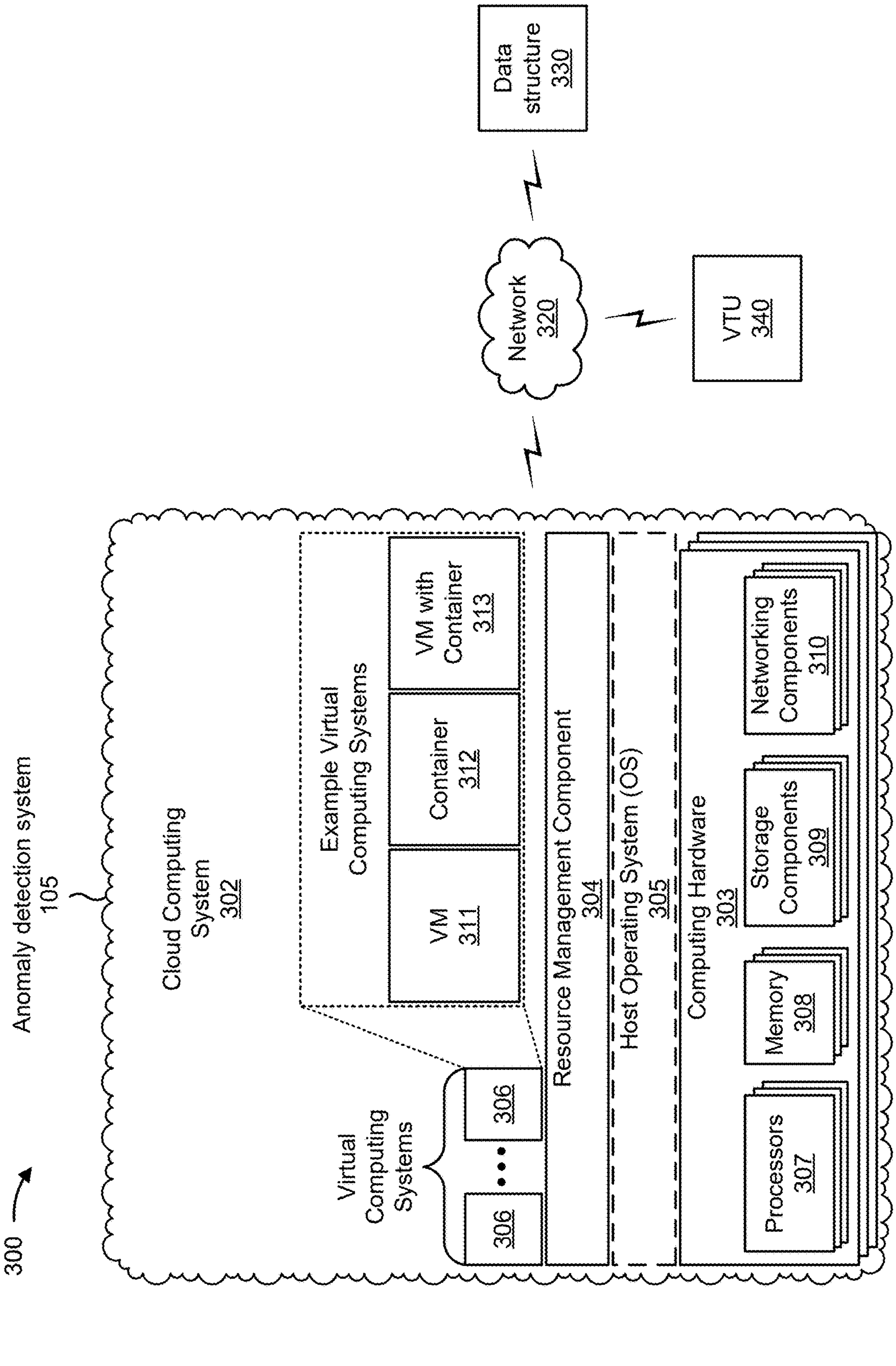
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the anomaly detection system 105, which may include one or more elements of and/or may execute within a cloud computing system 302. The cloud computing system 302 may include one or more elements 303-313, as described in more detail below. As further shown in FIG. 3, the environment 300 may include a network 320 and/or a data structure 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the anomaly detection system 105 may include one or more elements 303-313 of the cloud computing system 302, may execute within the cloud computing system 302, and/or may be hosted within the cloud computing system 302, in some implementations, the anomaly detection system 105 may not be cloud-based (e.g., may be implemented outside of a cloud computing system) or may be partially cloud-based. For example, the anomaly detection system 105 may include one or more devices that are not part of the cloud computing system 302, such as a device 400 of FIG. 4, which may include a standalone server or another type of computing device. The anomaly detection system 105 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The data structure 330 may include one or more devices capable of receiving, generating, storing, processing, and/or providing information, as described elsewhere herein. The data structure 330 may include a communication device and/or a computing device. For example, the data structure 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 330 may communicate with one or more other devices of environment 300, as described elsewhere herein.

The VTU 340 may include one or more devices capable of receiving, generating, storing, processing, and/or providing information, as described elsewhere herein. The VTU 340 may include a communication device and/or a computing device. For example, the VTU 340 may include a navigation device within an object (e.g., a vehicle, an asset, a person, an animal, and/or the like) that that utilizes satellite navigation to determine object movement and geographic position for identifying a location of the object. The VTU 340 may include a global positioning system (GPS) tracking unit, a geotracking unit, a satellite tracking unit, a wireless communication device, a mobile phone, a user equipment (UE), a laptop computer, a tablet computer, a wearable communication device (e.g., a smart wristwatch, a pair of smart eyeglasses, a head mounted display, or a virtual reality headset), an IoT device, or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
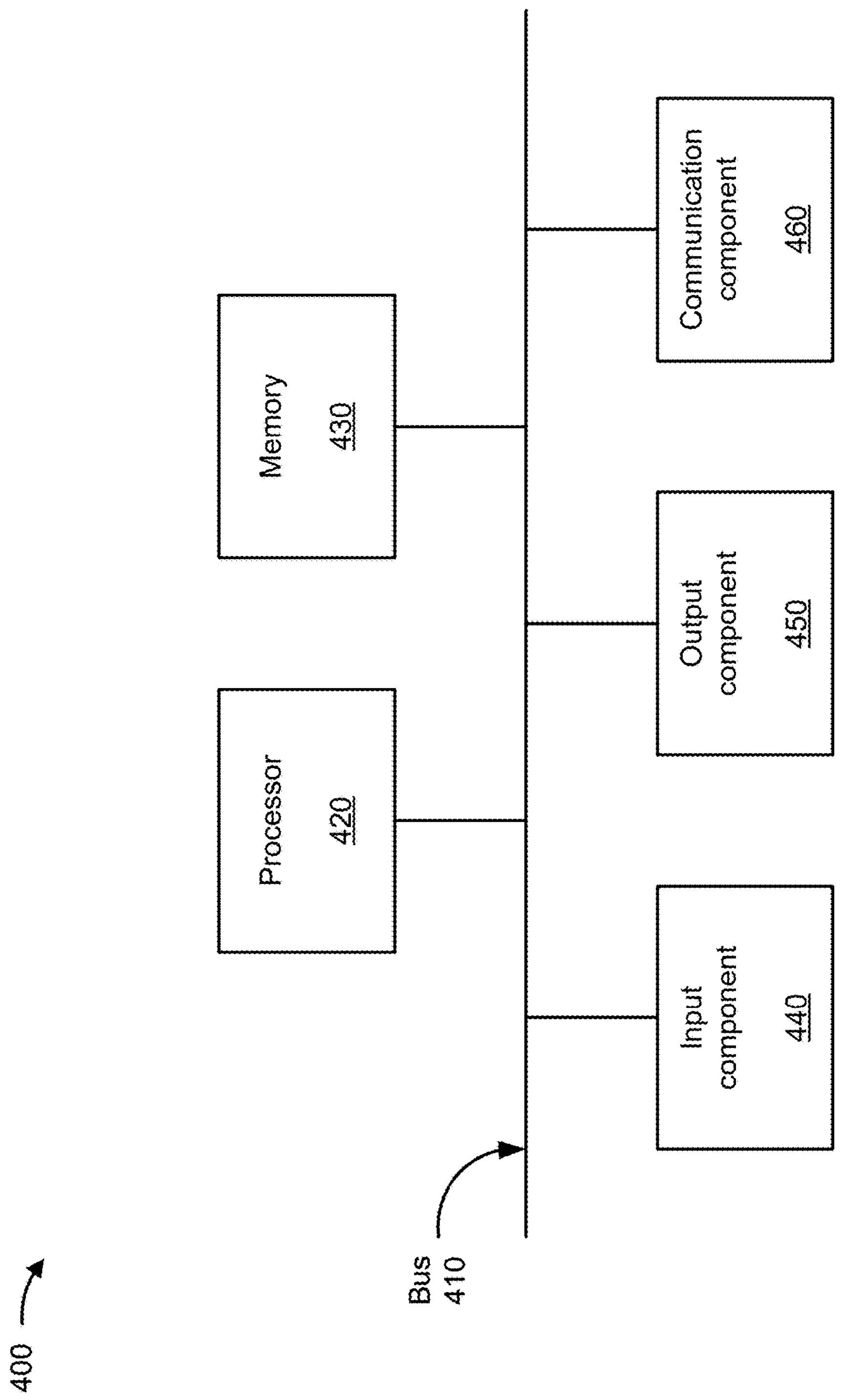
FIG. 4 is a diagram of example components of one or more devices of FIG. 3.

FIG. 4 is a diagram of example components of a device 400, which may correspond to the anomaly detection system 105, the data structure 330, and/or the VTU 340. In some implementations, the anomaly detection system 105, the data structure 330, and/or the VTU 340 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
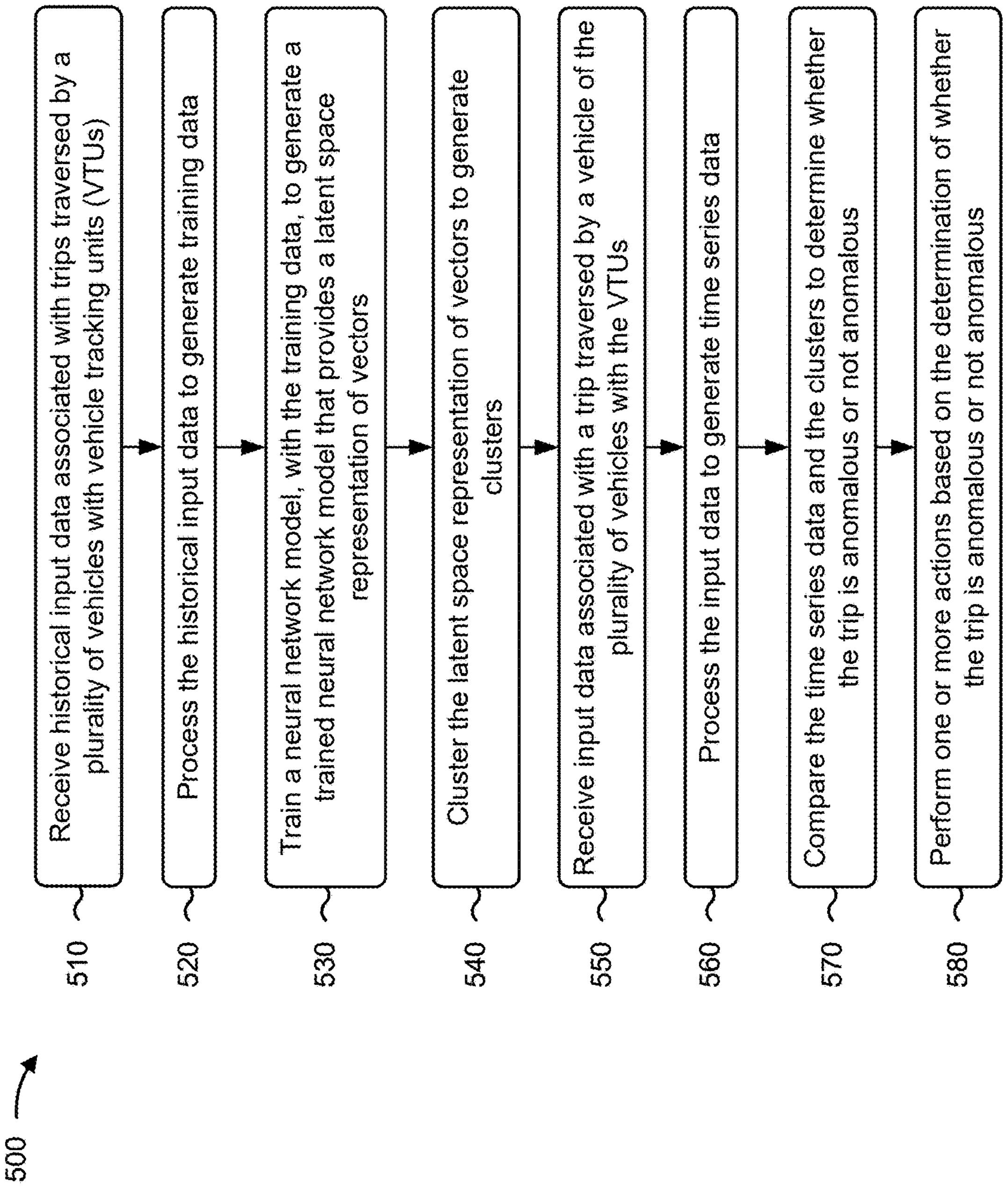
FIG. 5 is a flowchart of an example process for automatically detecting anomalous driving patterns in vehicles.

FIG. 5 depicts a flowchart of an example process 500 for automatically detecting anomalous driving patterns in vehicles. In some implementations, one or more process blocks of FIG. 5 may be performed by a device (e.g., the anomaly detection system 105). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving historical input data associated with trips traversed by a plurality of vehicles with VTUs (block 510). For example, the device may receive historical input data associated with trips traversed by a plurality of vehicles with VTUs, as described above. In some implementations, the historical input data includes data identifying one or more of geographical positions of the plurality of vehicles over a time period, speeds of the plurality of vehicles over the time period, accelerations of the plurality of vehicles over the time period, headings of the plurality of vehicles over the time period, proximities of the plurality of vehicles to intersections over the time period, or types of roads traversed by the plurality of vehicles over the time period.

As further shown in FIG. 5, process 500 may include processing the historical input data to generate training data (block 520). For example, the device may process the historical input data to generate training data, as described above. In some implementations, processing the historical input data to generate the training data includes generating temporally ordered sets of feature vectors based on the historical input data, and normalizing the temporally ordered sets of feature vectors to generate the training data.

As further shown in FIG. 5, process 500 may include training a neural network model, with the training data, to generate a trained neural network model that provides a latent space representation of vectors (block 530). For example, the device may train a neural network model, with the training data, to generate a trained neural network model that provides a latent space representation of vectors, as described above. In some implementations, the neural network model is a variational autoencoder model.

As further shown in FIG. 5, process 500 may include clustering the latent space representation of vectors to generate clusters (block 540). For example, the device may cluster the latent space representation of vectors to generate clusters, as described above. In some implementations, the clusters identify different types of trips traversed by the plurality of vehicles.

As further shown in FIG. 5, process 500 may include receiving input data associated with a trip traversed by a vehicle of the plurality of vehicles with the VTUs (block 550). For example, the device may receive input data associated with a trip traversed by a vehicle of the plurality of vehicles with the VTUs, as described above.

As further shown in FIG. 5, process 500 may include processing the input data to generate time series data (block 560). For example, the device may process the input data to generate time series data, as described above.

As further shown in FIG. 5, process 500 may include comparing the time series data and the clusters to determine whether the trip is anomalous or not anomalous (block 570). For example, the device may compare the time series data and the clusters to determine whether the trip is anomalous or not anomalous, as described above. In some implementations, comparing the time series data and the clusters to determine whether the trip is anomalous or not anomalous includes determining a proximity of the trip with the clusters, and selectively determining that the trip is anomalous based on determining that the proximity of the trip with the clusters fails to satisfy a threshold distance, or determining that the trip is not anomalous based on determining that the proximity of the trip with the clusters satisfies the threshold distance.

As further shown in FIG. 5, process 500 may include performing one or more actions based on the determination of whether the trip is anomalous or not anomalous (block 580). For example, the device may perform one or more actions based on the determination of whether the trip is anomalous or not anomalous, as described above. In some implementations, performing the one or more actions includes one or more of scheduling a driver of the vehicle for training based on the determination that the trip is anomalous, or causing emergency services to be dispatched for the vehicle based on the determination that the trip is anomalous. In some implementations, performing the one or more actions includes one or more of generating an alert for a driver of the vehicle based on the determination that the trip is anomalous, or generating an alert for a fleet manager of the vehicle based on the determination that the trip is anomalous. In some implementations, performing the one or more actions includes one or more of causing video for the vehicle to be recorded based on the determination that the trip is anomalous, or retraining the neural network model based on the determination of whether the trip is anomalous or not anomalous.

In some implementations, process 500 includes comparing the determination of whether the trip is anomalous or not anomalous with historical determinations included in a data structure. In some implementations, process 500 includes expanding the clusters based on feedback and to address falsely detected not anomalous trips. In some implementations, process 500 includes reducing the clusters based on feedback and to address falsely detected anomalous trips. In some implementations, process 500 includes including anomalous trips in the training data to cause the trained neural network model to generate an anomaly cluster.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, historical input data associated with trips traversed by a plurality of vehicles with vehicle tracking units (VTUs), wherein the historical input data includes data identifying harsh driving events comprising one or more of: harsh acceleration, harsh cornering, or an impact experienced by one or more of the plurality of vehicles;

processing, by the device, the historical input data to generate training data;

training, by the device, a neural network model, with the training data, to generate a trained neural network model that provides a latent space representation of vectors;

clustering, by the device, the latent space representation of vectors to generate clusters, each of the clusters representing a type or a class;

receiving, by the device, input data associated with a trip traversed by a vehicle of the plurality of vehicles with the VTUs;

processing, by the device, the input data to generate time series data;

comparing, by the device, the time series data and the clusters to determine whether the trip is anomalous or not anomalous; and performing, by the device, one or more actions based on the determination of whether the trip is anomalous or not anomalous.

2. The method of claim 1, further comprising:

comparing the determination of whether the trip is anomalous or not anomalous with historical determinations included in a data structure.

3. The method of claim 1, further comprising:

expanding the clusters based on feedback and to address falsely detected not anomalous trips.

4. The method of claim 1, further comprising:

reducing the clusters based on feedback and to address falsely detected anomalous trips.

5. The method of claim 1, further comprising:

including anomalous trips in the training data to cause the trained neural network model to generate an anomaly cluster.

6. The method of claim 1, wherein performing the one or more actions comprises one or more of:

scheduling a driver of the vehicle for training based on the determination that the trip is anomalous; or causing emergency services to be dispatched for the vehicle based on the determination that the trip is anomalous.

7. The method of claim 1, wherein performing the one or more actions comprises one or more of:

generating an alert for a driver of the vehicle based on the determination that the trip is anomalous; or generating an alert for a fleet manager of the vehicle based on the determination that the trip is anomalous.

8. A device, comprising:

one or more processors configured to:

receive historical input data associated with trips traversed by a plurality of vehicles with vehicle tracking units (VTUs), wherein the historical input data includes data identifying harsh driving events comprising one or more of: harsh acceleration, harsh cornering, or an impact experienced by one or more of the plurality of vehicles;

process the historical input data to generate training data;

train a neural network model, with the training data, to generate a trained neural network model that provides a latent space representation of vectors;

cluster the latent space representation of vectors to generate clusters, each of the clusters representing a type or a class;

receive input data associated with a trip traversed by a vehicle of the plurality of vehicles with the VTUs;

process the input data to generate time series data;

compare the time series data and the clusters to determine whether the trip is anomalous or not anomalous;

compare the determination of whether the trip is anomalous or not anomalous with historical determinations included in a data structure; and perform one or more actions based on the determination of whether the trip is anomalous or not anomalous.

9. The device of claim 8, wherein the one or more processors, to perform the one or more actions, are configured to one or more of:

cause video for the vehicle to be recorded based on the determination that the trip is anomalous; or retrain the neural network model based on the determination of whether the trip is anomalous or not anomalous.

10. The device of claim 8, wherein the historical input data further includes data identifying one or more of:

geographical positions of the plurality of vehicles over a time period, speeds of the plurality of vehicles over the time period, accelerations of the plurality of vehicles over the time period, headings of the plurality of vehicles over the time period, proximities of the plurality of vehicles to intersections over the time period, or types of roads traversed by the plurality of vehicles over the time period.

11. The device of claim 8, wherein the one or more processors, to process the historical input data to generate the training data, are configured to:

generate temporally ordered sets of feature vectors based on the historical input data; and normalize the temporally ordered sets of feature vectors to generate the training data.

12. The device of claim 8, wherein the neural network model is a variational autoencoder model.

13. The device of claim 8, wherein the clusters identify different types of trips traversed by the plurality of vehicles.

14. The device of claim 8, wherein the one or more processors, to compare the time series data and the clusters to determine whether the trip is anomalous or not anomalous, are configured to:

determine a proximity of the trip with the clusters; and selectively:

determine that the trip is anomalous based on determining that the proximity of the trip with the clusters fails to satisfy a threshold distance; or determine that the trip is not anomalous based on determining that the proximity of the trip with the clusters satisfies the threshold distance.

15. A non-transitory computer-readable medium storing a set of instructions, the set of instructions comprising:

one or more instructions that, when executed by one or more processors of a device, cause the device to:

receive input data associated with a trip traversed by a vehicle;

process the input data to generate time series data;

compare the time series data and clusters to determine whether the trip is anomalous or not anomalous, each of the clusters representing a type or a class, wherein the clusters are generated via a neural network model that is trained with historical input data associated with trips traversed by a plurality of vehicles with vehicle tracking units (VTUs), wherein the historical input data includes data identifying harsh driving events comprising one or more of: harsh acceleration, harsh cornering, or an impact experienced by one or more of the plurality of vehicles; and perform one or more actions based on the determination of whether the trip is anomalous or not anomalous.

16. The non-transitory computer-readable medium of claim 15, wherein the one or more instructions further cause the device to:

compare the determination of whether the trip is anomalous or not anomalous with historical determinations included in a data structure.

17. The non-transitory computer-readable medium of claim 15, wherein the one or more instructions further cause the device to:

expand the clusters based on feedback and to address falsely detected not anomalous trips.

18. The non-transitory computer-readable medium of claim 15, wherein the one or more instructions further cause the device to:

reduce the clusters based on feedback and to address falsely detected anomalous trips.

19. The non-transitory computer-readable medium of claim 15, wherein the one or more instructions further cause the device to:

include anomalous trips in the historical input data to cause the neural network model to generate an anomaly cluster.

20. The non-transitory computer-readable medium of claim 15, wherein the one or more instructions, that cause the device to perform the one or more actions, cause the device to one or more of:

schedule a driver of the vehicle for training based on the determination that the trip is anomalous;

cause emergency services to be dispatched for the vehicle based on the determination that the trip is anomalous;

generate an alert for a driver of the vehicle based on the determination that the trip is anomalous;

generate an alert for a fleet manager of the vehicle based on the determination that the trip is anomalous;

cause video for the vehicle to be recorded based on the determination that the trip is anomalous; or retrain the neural network model based on the determination of whether the trip is anomalous or not anomalous.

* * * * *